March 3, 1970  P. G. WILLER  3,497,937
METHOD OF MAKING CAST WHEEL BODY
Filed July 31, 1967
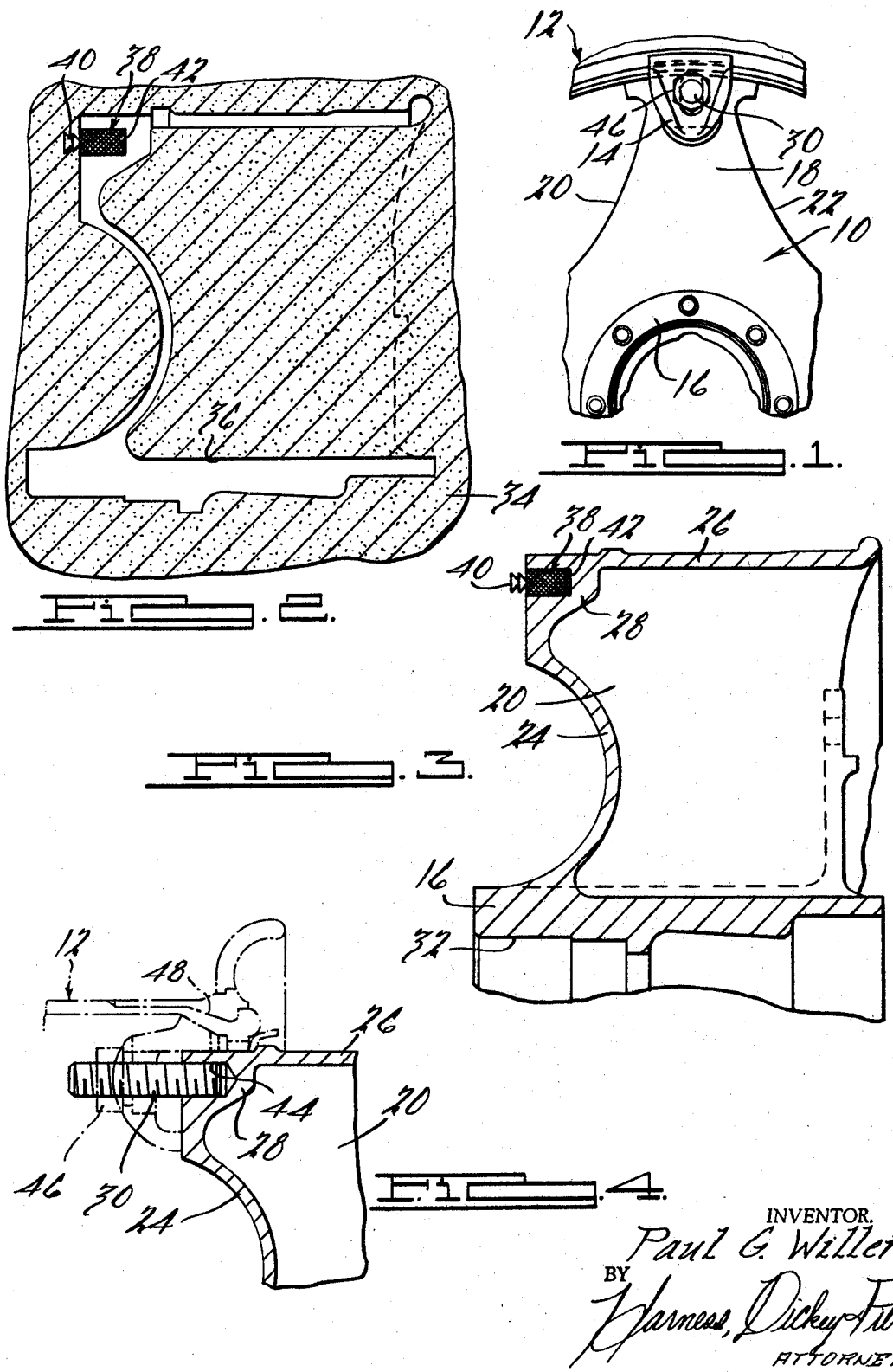
INVENTOR.
Paul G. Willer
BY
Harness, Dickey & Pierce
ATTORNEYS

# United States Patent Office 3,497,937
Patented Mar. 3, 1970

3,497,937
METHOD OF MAKING CAST WHEEL BODY
Paul G. Willer, Rockford, Ill., assignor to Kelsey-Hayes Company, a corporation of Delaware
Filed July 31, 1967, Ser. No. 657,135
Int. Cl. B21h 1/02
U.S. Cl. 29—159.01          4 Claims

ABSTRACT OF THE DISCLOSURE

A method for making a cast wheel body which eliminates the presence of voids and blowholes in sections of the casting to be subjected to machine operations by positioning machinable metal inserts in a sand mold at locations corresponding to the positions at which subsequent machining operations are to be performed and thereafter pouring molten metal into the mold cavity, effecting an embedment of the inserts in a solidified casting. The resultant casting is thereafter removed from the mold and the inserts are removed by a metal cutting tool, providing cavities or bores which are receptive for receiving and engaging ancillary components such as studs and the like.

BACKGROUND OF THE INVENTION

Automatic machines are in widespread commercial use for performing an individual or a sequence of work operations on workpieces, minimizing manual handling and total labor requirements in producing finished parts. Automatic machines of the types well known in the art have been found particularly satisfactory for performnig final machining operations such as boring, reaming, surface grinding, etc. on metal castings in those areas requiring surfaces having relatively critical dimensional tolerances. In the manufacture of heavy duty vehicle wheels of the types employed for trucks and the like, the wheel body is formed of a metal casting on which one or more wrought iron tire supporting rims are removably clamped, forming a wheel assembly. The cast wheel body necessitates the performance of a series of finish machining operations in the area of the hub, as well as in forming bores in which studs are adapted to be threadably secured for mounting suitable clamping fixtures for retaining the wrought steel rims in appropriate axially aligned relationship therearound.

A continuing problem in the machining of such metal castings employing automatic machines has been the excessive wear and stresses imposed on the edges of the cutting tools as the result of voids or blow holes present in the castings. The presence of such blowholes and voids is particularly pronounced in the relatively thick sections of the castings where gaseous products are more apt to become entrapped during the pouring of the molten metal and its subsequent solidification. Conventionally, such thick sections serve the purpose of securing ancillary attachments, such as studs, to the casting, necessitating finish machining operations which are accompanied by uneven loadings on the cutting edges of the tool and tool chatter in response to the movement of the tool through the cast mass having pores or voids of irregular size and distribution. The presence of such voids and blowholes also frequently results in machined surfaces and bores which are of less than optimum accuracy.

SUMMARY OF THE INVENTION

The foregoing problems occasioned in the manufacture of machined metal castings and particularly in the manufacture of heavy-duty cast wheel bodies are overcome in accordance with the present invention by a process in which metal inserts possessing uniform machinable properties are accurately positioned in a cavity of a mold at locations corresponding to the locations in the final cast body at which subsequent machining operations are to be performed. Accordingly, upon solidification of the molten metal, the casting and the inserts embedded at preselected locations therein, is removed from the mold and the casting thereafter is subjected to metal finishing operations wherein the inserts are removed by a metal cutting tool of a size slightly larger than the insert itself, assuring the presentation of a metal mass which has uniform machining characteristics avoiding thereby the imposition of uneven and excessive stresses on the cutting edges of the tool substantially prolonging tool life. In acccordance with this method, the cavities and bore holes formed in the cast body by the removal of the metal inserts by machining are substantially more accurate in configuration, providing for an improved mating fit with other components to be affixed therein than has heretofore been attainable when machining such cavities directly in the body of the cast metal.

Other objects and benefits of the present invention will become apparent upon a reading of the description of the preferred embodiments taken in conjunction with the accompanying drawing.

BRIEF DESCRIPTION OF THE DRAWING

FIGURE 1 is a fragmentary front elevational view of a typical cast wheel body formed wth a removable clamp on the end of one spoke thereof for removably clamping a wheel rim thereon;

FIGURE 2 is a fragmentary transverse sectional view through a sand mold having a cavity therein and in which cavity metal inserts are selectively positioned preparatory to the pouring of molten metal therein;

FIGURE 3 is a fragmentary transverse sectional view of a casting formed from the mold illustrated in FIGURE 2 and illustrating the machinable metal insert embedded in a thick section thereof, and FIGURE 4 is a fragmentary transverse sectional view, partly in phantom, illustrating the fastening of a stud in a bore hole formed in the casting formerly occupied by the machinable metal insert.

DESCRIPTION OF THE PREFERRED EMBODIMENTS

Referring now in detail to the drawing, and as may be best seen in FIGURE 1, a typical heavy-duty wheel assembly is illustrated comprising a cast wheel body 10 and a rim 12 removably held by means of a clamp 14 in appropriate position thereon. The wheel body, as illustrated in the figures, is of a type which enables a pair of tire-supporting rims to be mounted thereon in appropriate spaced axial relationship and is more completely disclosed in United States Patent No. 3,079,200, issued Feb. 26, 1963, entitled "Dual Tire Wheel Structure," and which patent is assigned to the same assignee as the present invention. Reference is made to the aforementioned United States patent for further details regarding the specific mechanism for removably attaching the tire rims to the periphery of the cast wheel body.

For the purpose of understanding the present invention, suffice it to say that the exemplary wheel body 10 is formed with a central hub 16, to which a plurality of angularly spaced and radially extending spokes 18 are integrally affixed. Each spoke 18 is of a hollow construction comprising a pair arcuate side walls 20 and 22, integrally interconnected by an outboard side wall 24. The outer ends of all of the side walls of each spoke are connected by an end or arcuate supporting wall 26. The outer radial end of the outboard side wall 24 is formed with an enlarged section, indicated at 28 in the figures, for the purpose of threadably receiving the shank end of a stud 30, as shown in FIGURE 4, on which the clamp 14 is mounted.

The central hub 16 itself is formed with a stepped bore 32 therethrough in which suitable antifriction bearings are adapted to be positioned for rotatably supporting the wheel body. It will be understood that the present invention is equally applicable to other cast wheel body constructions of alternative configurations which are also susceptible to the formation of pores, voids and/or blowholes in cast sections thereof which are subsequently subjected to further machining operations.

In accordance with the practice of the present invention, a suitable mold 34, as shown in FIGURE 2, is formed with a cavity 36, having a configuration corresponding substantially to that of the finished wheel body. The mold 34 and the cavity therein is formed in accordance with well known foundry practices and conventionally comprises a green sand mixture. One or more inserts 38 are positioned in the cavity 36 at selected locations corresponding to the positions at which subsequent machining of the resultant solidified casting is to be done. Specifically, in the arrangement as illustrated in FIGURE 2, the insert 38 is located in the area of the cavity 36 corresponding to the enlarged section 28 of the resultant cast wheel body which subsequently is drilled and tapped for threadably receiving the threaded stud 30.

The insert 38 is preferably formed with a projection or tab 40 affixed to one end thereof, which is adapted to be embedded within the compacted green sand mixture comprising the mold, thereby retaining the insert in appropriate position during the pouring of the molten metal, as well as during subsequent solidification thereof. The projection 40, as shown, comprises a pair of conical sections in apex-to-base connected relationship, which inhibits an inadvertent dislodgment of the insert from the mold structure. The insert itself, in the exemplary embodiment illustrated, is of an elongated circular cylindrical configuration having a cross-sectional diameter slightly less than that of the bore subsequently to be machined in the wheel body for receiving the threaded stud. It is preferred that the periphery of the insert is formed with a roughened or textured surface, as indicated at 42 in FIGURES 2 and 3, to enhance the mechanical interlocking relationship of the insert within the solidified casting. Such interlock is desirable to avoid inadvertent movement of the insert during the course of its removal during the subsequent drilling operation The precise location of the insert 38 within the mold cavity and the engagement of the projections thereon within the mold structure can conveniently be achieved simultaneously with the compacting of the green sand mixture against a suitable pattern board having apertures therein for removably receiving and maintaining the inserts in appropriate relationship thereon.

The cavity 36 of the mold 34 incorporating the insert 38 therein, as shown in FIGURE 2, is thereafter filled with molten metal and allowed to solidify, effecting a firm embedment of the insert within the solidified casting. The casting subsequently is removed from the mold and is of a configuration as exemplified in FIGURE 3. At this stage, the casting is ready for machining operation prior to which the projection or tab 40 on the insert 38 is removed, such as by chiseling or cutting it away, leaving the residual uniformly machinable core of the insert exposed at the surface of the casting. The resultant casting is thereafter subjected to a drilling operation wherein all of the insert 38 is removed forming a bore 44, which subsequently is tapped for threadably receiving and securing the threaded stud 30 therein. As shown in phantom in FIGURE 4, a nut 46 is adapted to be threadably engaged on the projecting end of the stud 30 for moving the clamp 14 in firm clamping engagement against a mounting rim 48 extending along the underside of the tire supporting rim 12. The provision of the insert 38 provides for a uniform even cutting operation during the removal of the insert and the metal of the cast body immediately adjacent thereto, minimizing the imposition of erratic stresses on the cutting tool and further assuring accuracy in the bore formed.

While it will be apparent that the invention herein disclosed is well calculated to fulfill the objects above stated, it will be appreciated that the invention is susceptible to modification, variation and change without departing from the proper scope or fair meaning of the subjoined claims.

What is claimed is:

1. A method for making a cast wheel body which comprises the steps of forming a mold having a cavity corresponding to the configuration of said wheel body, positioning a plurality of substantially uniform, solid machinable metal inserts provided with a coarse texture on at least a portion of the exterior surfaces thereof in said cavity in locations corresponding to the position of studs subsequently to be affixed in said body, casting molten metal into said cavity and around said inserts therein and in interlocking relationship with said coarse texture on the exterior surfaces thereof, removing the cast solidified said wheel body and said inserts embedded therein from said mold, removing the metal inserts by a metal cutting tool forming a plurality of bores, and thereafter inserting studs in said bores.

2. The method as described in claim 1, wherein each of said inserts is formed with an extension thereon adapted to be embedded in the body of said mold for maintaining said insert in the preselected location within said cavity prior to and during the pouring and solidification of said molten metal.

3. The method as described in claim 2, wherein said extensions are removed from said inserts prior to the removal of said inserts by said metal cutting tool.

4. The method as described in claim 1, wherein said insert is of a circular cylindrical configuration having a diameter smaller than the diameter of said metal cutting tool wherein the metal of said cast wheel body immediately adjacent to said insert is removed by said cutting tool.

References Cited

UNITED STATES PATENTS

| | | | |
|---|---|---|---|
| 2,865,087 | 12/1958 | Lucien | 29—159 |
| 3,302,273 | 2/1967 | Benton et al. | 29—159 |
| 3,305,918 | 2/1967 | Christen et al. | 29—529 X |
| 3,373,484 | 3/1968 | Larson et al. | 29—529 X |

JOHN F. CAMPBELL, Primary Examiner

D. C. REILEY, Assistant Examiner

U.S. Cl. X.R.

29—423, 527.3; 164—76